United States Patent
Konik et al.

(10) Patent No.: US 10,083,192 B2
(45) Date of Patent: *Sep. 25, 2018

(54) DELETED DATABASE RECORD REUSE

(71) Applicant: International Business Machines Corporation, Armonk, NY (US)

(72) Inventors: Rafal P. Konik, Oronoco, MN (US); Roger A. Mittelstadt, Byron, MN (US); Brian R. Muras, Otsego, MN (US); Chad A. Olstad, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 483 days.

This patent is subject to a terminal disclaimer.

(21) Appl. No.: 14/743,059

(22) Filed: Jun. 18, 2015

(65) Prior Publication Data

US 2016/0314156 A1 Oct. 27, 2016

Related U.S. Application Data (63) Continuation of application No. 14/691,678, filed on Apr. 21, 2015.

(51) Int. Cl.
*G06F 17/00* (2006.01)
*G06F 17/30* (2006.01)

(52) U.S. Cl.
CPC .............. *G06F 17/30309* (2013.01)

(58) Field of Classification Search
CPC ......... G06F 17/30309; G06F 17/30377; G06F 17/30; G06F 17/00

USPC ................................................. 707/600–899
See application file for complete search history.

(56) References Cited

U.S. PATENT DOCUMENTS

| | | | |
|---|---|---|---|
| 5,640,561 A | 6/1997 | Satoh et al. | |
| 6,947,956 B2 | 9/2005 | Olstad et al. | |
| 8,140,517 B2 | 3/2012 | Day et al. | |
| 9,116,943 B2 | 8/2015 | Freedman et al. | |
| 9,495,207 B1 | 11/2016 | Pjesivac-Grbovic et al. | |
| 2004/0083299 A1* | 4/2004 | Dietz ................ G06F 17/30985 |
| | | | 709/230 |

(Continued)

OTHER PUBLICATIONS

Hirzel et al., "A Catalog of Stream Processing Optimizations," IBM Research Report, ACM Computing Surveys (CSUR), Sep. 28, 2011, 30 pages. DOI:10.1145/0000000.0000000.

(Continued)

*Primary Examiner* — Isaac M Woo
(74) *Attorney, Agent, or Firm* — Nathan M. Rau (57) ABSTRACT

A computer-implemented method for reusing deleted database records includes, receiving, by a database manager executing within a computing device, a first query request to insert, into a database table, a first set of database records. The database manager identifies a first set of entries within a journal log bundle. The database manager also determines, in response to identifying a first set of entries, that there is a third set of deleted database records located on a same page as a second set of database records. The database manager also, in response to determining that there is a third set of deleted database records located on a same page as the second set of database records, inserts into the database table the first set of database records using the third set of deleted database records.

9 Claims, 5 Drawing Sheets

(56) References Cited

U.S. PATENT DOCUMENTS

2006/0143168 A1  6/2006  Rossmann
2008/0059492 A1  3/2008  Tarin

OTHER PUBLICATIONS

Copeland, G., "Database Buffer Management for High Availability," An IP.com Prior Art Database Technical Disclosure, Original Publication Date Apr. 1, 1993, IP.com Electronic Publication Date Mar. 19, 2015, 5 pages IP.com No. 000104392, http://null/IPCOM/000104392.

Unknown, "Disk Change Block Tracking Using a Separate Partition," An IP.com Prior Art Database Technical Disclosure, IP.com Electronic Publication Date Jun. 3, 2011, 11 pages, Copyright © 2010, 2011 Symantec Corporation IP.com No. 000207604, http://null/IPCOM/000207604.

Unknown, "Locality and the Fast File System," Operating Systems (Version 0.81), 2014, 11 pages, Copyright © 2014 Arpaci-Dusseau, www.ostep.org.

Konik et al., "Deleted Database Record Reuse," U.S. Appl. No. 14/691,678, filed Apr. 21, 2015.

List of IBM Patents or Patent Applications Treated as Related.

* cited by examiner

|  | RRN | Column X | Other Column Data |
|---|---|---|---|
| Page 1 | 1 | 7 | *** |
|  | 2 | <deleted> | <deleted> |
|  | 3 | 1 | *** |
| Page 2 | 4 | 3 | *** |
|  | 5 | 9 | *** |
|  | 6 | <deleted> | <deleted> |
|  | 7 | <deleted> | <deleted> |
| Page 3 | 8 | 8 | *** |
|  | 9 | 2 | *** |
|  | 10 | 5 | *** |
|  | 11 | 6 | *** |
| Page 4 | 12 | <deleted> | <deleted> |
|  | 13 | 10 | *** |
|  | 14 | 4 | *** |
|  | 15 | 11 | *** |

FIG. 5

DELETED DATABASE RECORD REUSE

BACKGROUND

This disclosure relates generally to database management systems, and more specifically, to reusing deleted database records.

Database manager modules may perform the two functions of accessing and modifying data from a database table within a file. Database manager modules may access data by selecting and delivering particular database records requested by a user based on a query statement. The query statement specifies the particular attributes, table, and query conditions that a user desires. Database manager modules may modify data by inserting (writing) new database records (rows) in a table, updating (writing) values within the database records, or deleting particular database records from a table matching specified query conditions.

When a new database record is inserted into a database table, database manager modules may employ an operation called "Reuse Deleted" (RD) records (e.g., REUSEDLT (*YES)). The RD records operation allows a database manager module to insert a new database record by using a previously deleted database record. When a database record is deleted through a delete operation, the database manager module may flag the database record as deleted. This means that the database record may still exist in the database even though the flagged database records cannot be accessed through a query. Accordingly, when the insert and RD records operations occur, the delete flags may be released on the previously deleted record such that the insert operation may access and reuse the previously deleted record.

SUMMARY

One or more embodiments are directed to a computer-implemented method for reusing deleted database records. The method can include receiving, by a database manager executing within a computing device, a first query request to insert, into a database table, a first set of database records. The method can include identifying, by the database manager, a first set of entries within a journal log bundle, the first set of entries corresponding to a second set of database records that have been modified within the database table. In response to identifying, by the database manager, the first set of entries, the method may also include determining, by the database manager, that there is a third set of deleted database records located on a same page as the second set of database records. In response to the determining, by the database manager, that there is a third set of deleted database records located on a same page as the second set of database records, the method may further include inserting into the database table the first set of database records using the third set of deleted database records.

One or more embodiments are directed to a system for reusing deleted database records. The system may include a computing device having a processor and a memory. The memory may store program instructions. The program instructions executable by the processor cause the system to receive a first query request to insert, into a database table, a first set of database records. The program instructions executable by the processor may further cause the system to identify a first set of entries within a journal log bundle, the first set of entries corresponding to a second set of database records that have been modified within the database table. In response to identifying a first set of entries within a journal log bundle, the program instructions may also cause the system to determine that there is a third set of deleted database records located on a same page as the second set of database records. In response to determining that there is a third set of deleted database records located on a same page as the second set of database records, the program instructions may further cause the system to insert into the database table the first set of database records using the third set of deleted database records.

One or more embodiments are directed to a computer program product that includes a computer readable storage medium having program code embodied therewith. The program code comprising computer readable program code may be configured for receiving a first query request to insert, into a database table, a first set of database record. The program code may be further configured for identifying a first set of entries within a journal log bundle, the first set of entries corresponding to a second set of database records that have been modified within the database table. In response to identifying a first set of entries within a journal log bundle, the program code may also be configured for determining that the second set of database records are located on a first page and that a second set of entries within the journal log bundle correspond to a third set of deleted database records located on a second page. In response to determining that a second set of entries within the journal log bundle correspond to a third set of deleted database records located on a second page, the program code may be configured for inserting into the database table the first set of database records using the third set of deleted database records.

While embodiments described herein are amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to database management systems, more particular aspects relate to reusing deleted database records. While the present disclosure is not necessarily limited to such applications, various aspects of the disclosure may be appreciated through a discussion of various examples using this context.

When a previously deleted database record (flagged database record) is selected to become a new inserted database record, the previously deleted record may be selected from an arbitrary position within a database table. For example, a user may issue a query to insert a database record. The database manager may select a previously deleted record in the table located on page 1, which may not be part of a current journal log bundle. Accordingly, the selection of the previously deleted database record may cause unnecessary additional input/output (I/O) operations needed to make database table changes, as the database manager may have to write the reusing of the deleted database records located on page 1, and the write the journal log bundle in two or more separate I/O operations. Therefore, embodiments of the present disclosure are directed to reusing deleted database records located on a same page (or close to the same page) as a current modification within a journal log bundle, which may increase the efficiency of I/O operations performed.

When a particular database record is inserted, updated, or deleted, a journal manager may cache or buffer the change in memory as an entry to a journal log. The entry may specify the data that was changed, an identification number (e.g., a Relative Record Number (RRN)), and the particular time of the operation, which may be useful for recovery purposes. These and other entries in the journal log may be bundled together before the bundle reaches a particular write size (e.g., an optimal write size of 128 k). In various embodiments, only when the bundle reaches the particular write size, is the bundled information written to a storage device (e.g., disk). When a user performs a multi-operational transaction, the user may perform a first operation (e.g., update a database record) and an insert operation at a later time. In some embodiments, the database manager may utilize the first operation entry within the bundle of a journal log to find a corresponding page of the first operation, as described in more detail below. Accordingly, a database manager may find previously deleted database records located on the same page as a first operation to complete an insert operation. These changes may therefore be written to the storage device during a single I/O operation, as opposed to multiple I/O operations.

Figure 1:
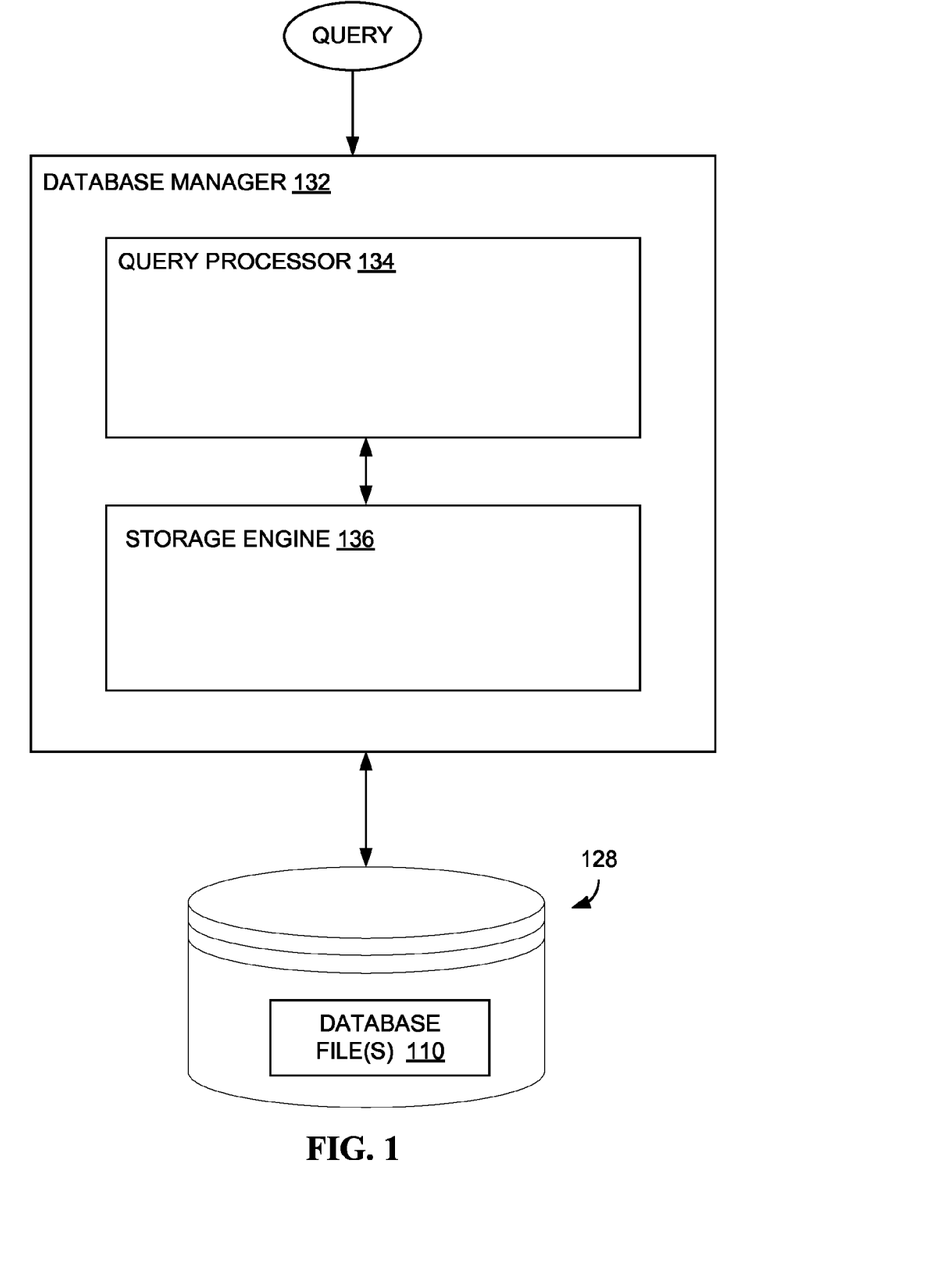
FIG. 1 is a block diagram illustrating one embodiment of an example database manager.

FIG. 1 is a block diagram of one embodiment of an example database manager 132. In an embodiment, the database manager 132 may include a query processor 134 and a storage engine 136, which may interact with a one or more database files 110 within a storage device 128. In some embodiments, the components and data shown in FIG. 1 may include instructions or statements that execute on a processor, such as the processor 206 in FIG. 2, or instructions or statements that are interpreted by instructions or statements that execute on the processor 206 to carry out the functions as further described below. In addition, in some embodiments, the components shown in FIG. 1 may be implemented in hardware via semiconductor devices, chips, logical gates, circuits, circuit cards, and/or other physical hardware devices in lieu of, or in addition to, a processor-based system. In an embodiment, the components shown in FIG. 1 may include data in addition to instructions or statements.

In various embodiments, these components and data are operable to receive a query request to insert, into a database table, a first set of database records located on a first page, and to determine that there is a first set of deleted database records located on the first page. In response to the determining that there is a set of deleted database records located on the first page, the components and data are further operable to insert, into the database table, the set of database records using the first set of deleted database records. The phrase "set of" (e.g., set of database records), as discussed herein shall mean at least one of.

Consistent with some embodiments, a user may issue a query request and the database manager 132 may receive the query request to modify a set of database records. For example, a user may issue a first query request to delete a first set of database records located on a first page. A user may then issue a second query request to insert a second set of database records located on the first page. In an embodiment of the present disclosure, the database manager reuses the first, deleted set of database records from the first query request to insert the second, new set of database records into a table of the database file 110, as described below. In some embodiments, the query request may also specify updating a set of database values within a set of database records. The query request may be written in any suitable query language that corresponds to the desired database type. For example, the query request may be written in structured query language (SQL) for relational databases, data manipulation language (DML) for inserting, updating, or deleting database records in relational databases, multidimensional expression (MDX) for multidimensional or online analytical procession (OLAP) databases, or any other language for any other database.

In an embodiment, the database manager 132 may initiate the process of selecting the one or more database records that are being requested from the query request by utilizing the query processor 134. The query processor 134 may generate several plans to access database records and execute the most efficient plan, as explained further below. Alternatively, the query processor 134 may generate an efficient plan, which is not necessarily the most efficient. The query processor 134 may include such components as a compiler, a parser engine, an optimizer engine, and an execution engine. A compiler may receive the query request and convert the query request into machine-readable object code.

The parser engine may receive the compiled query request and check that the query request is correctly specified, resolve names and references, and convert the query request into a format utilized by the optimizer engine. The parser engine may convert the query request into a data structure, which gives a structural representation of the query request. For example, the data structure may be an abstract syntax tree, parse tree, or other data structure. In various embodiments, the parser engine may make a plurality of checks, including a syntax check, a check determining whether the query request is meaningful (e.g., whether objects and columns in the query request exist), and a shared pool check.

In various embodiments, the optimizer engine receives the parsed query request and in response determines an efficient or most efficient query execution plan of selecting the one or more database records based on which database record(s) are requested in the query request. This may occur by determining the cost of each query execution plan through an estimator. In an embodiment, an estimator may estimate the cost of each query execution plan by measuring the units of work or resources used. For example, the estimator may use disk I/O, central processing unit (CPU) usage, and memory usage to calculate units of work. The cost of a query execution plan may accordingly represent a number of work units that are expected to be absorbed when the query request is executed and the results produced. In an embodiment, the execution engine receives an efficient or most efficient query execution plan according to the optimizer engine, and executes the query against the database files 110. The execution engine may also order tables in any particular join order according to any join method, which is chosen by the optimizer engine. For example, the execution engine may run a nested loop, sort merge, or hash method as the join method chosen by the optimizer engine.

In various embodiments, the storage engine 136 uses the chosen query execution plan from the query processor 134 to select one or more database records from the database files 110. In other embodiments, the one or more database records are stored in the same memory, such as memory 212 in FIG. 2, as instructions or statements for executing one or more of the functions of the database manager 132, and are therefore be selected from the memory 212. In some embodiments, the storage engine 136 is a part of the execution engine of the query processor 134. The storage engine 136 provides an interface between low level data stored in database files 110 and higher level applications. The storage engine 136 may interface with the database files 110 by translating various query requests into low-level file system commands. For example, the storage engine 136 may be responsible for the actual inserting or deleting (or updating of values) of database records from a table within the database files 110.

Figure 2:
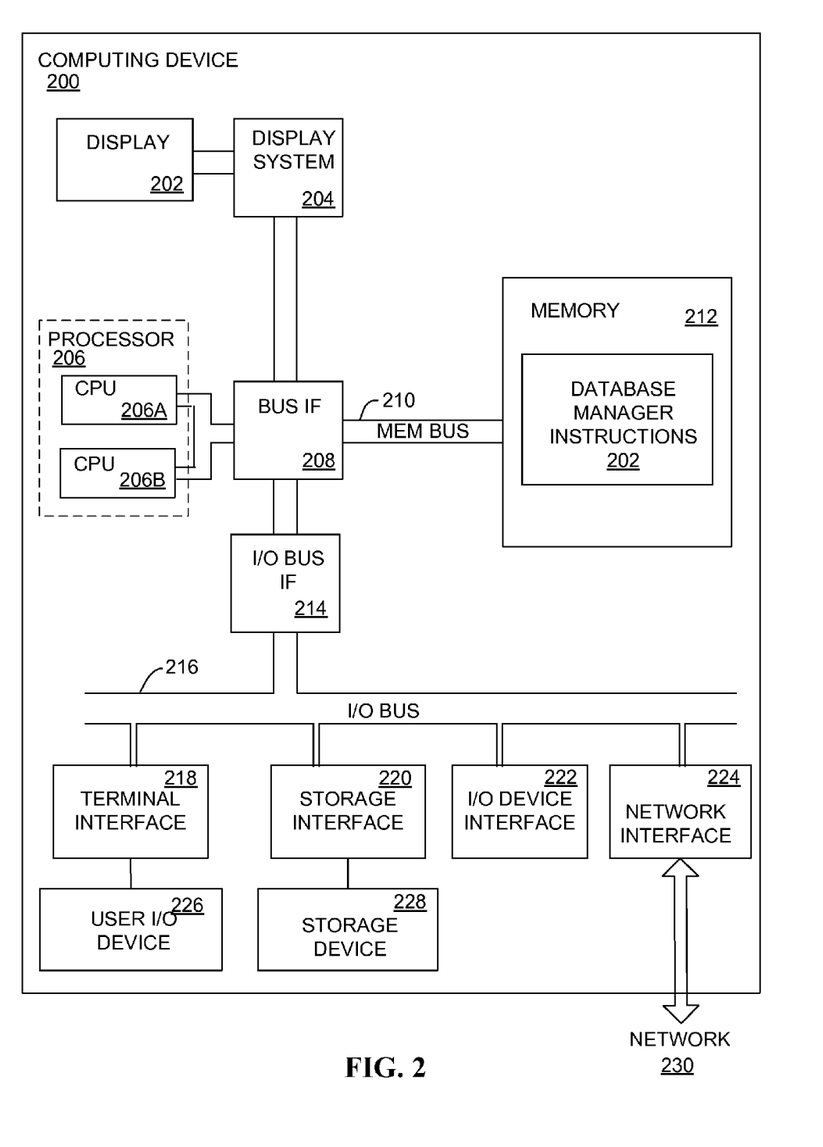
FIG. 2 is a block diagram of one embodiment of an example of a computing device that includes a memory with database manager instructions.

FIG. 2 is a block diagram of one embodiment of an example computing device that includes a memory with database manager instructions. The components of the computing device 200 can include one or more processors 206, a memory 212, a terminal interface 218, a storage interface 220, an Input/Output ("I/O") device interface 222, and a network interface 224, all of which are communicatively coupled, directly or indirectly, for inter-component communication via a memory bus 210, an I/O bus 216, bus interface unit ("IF") 208, and an I/O bus interface unit 214.

The computing device 200 may include one or more general-purpose programmable central processing units (CPUs) 206A and 206B, herein generically referred to as the processor 206. In an embodiment, the computing device 200 may contain multiple processors; however, in another embodiment, the computing device 200 may alternatively be a single CPU device. Each processor 206 executes database manager instruction 202 stored in the memory 212, which may be identical to the database manager 132 of FIG. 1.

The computing device 200 may include a bus interface unit 208 to handle communications among the processor 206, the memory 212, the display system 204, and the I/O bus interface unit 214. The I/O bus interface unit 214 may be coupled with the I/O bus 216 for transferring data to and from the various I/O units. The I/O bus interface unit 214 may communicate with multiple I/O interface units 218, 220, 222, and 224, which are also known as I/O processors (IOPs) or I/O adapters (IOAs), through the I/O bus 216. The display system 204 may include a display controller, a display memory, or both. The display controller may provide video, audio, or both types of data to a display device 202. The display memory may be a dedicated memory for buffering video data. The display system 204 may be coupled with a display device 202, such as a standalone display screen, computer monitor, television, a tablet or handheld device display, or another other displayable device. In an embodiment, the display device 202 may include one or more speakers for rendering audio. Alternatively, one or more speakers for rendering audio may be coupled with an I/O interface unit. In alternate embodiments, one or more functions provided by the display system 204 may be on board an integrated circuit that also includes the processor 206. In addition, one or more of the functions provided by the bus interface unit 208 may be on board an integrated circuit that also includes the processor 206.

The I/O interface units support communication with a variety of storage and I/O devices. For example, the terminal interface unit 218 supports the attachment of one or more user I/O devices, which may include user output devices (such as a video display devices, speaker, and/or television set) and user input devices (such as a keyboard, mouse, keypad, touchpad, trackball, buttons, light pen, or other pointing devices). A user may manipulate the user input devices using a user interface, in order to provide input data and commands to the user I/O device 226 and the computing device 200, and may receive output data via the user output devices. For example, a user interface may be presented via the user I/O device 226, such as displayed on a display device, played via a speaker, or printed via a printer.

The storage interface 220 supports the attachment of one or more disk drives or direct access storage devices 228 (which are typically rotating magnetic disk drive storage devices, although they could alternatively be other storage devices, including arrays of disk drives configured to appear as a single large storage device to a host computer, or solid-state drives, such as a flash memory). In another embodiment, the storage device 228 may be implemented via any type of secondary storage device. The contents of the memory 212, or any portion thereof, may be stored to and retrieved from the storage device 228 as needed. The I/O device interface 222 provides an interface to any of various other I/O devices or devices of other types, such as printers or fax machines. The network interface 224 provides one or more communication paths from the computing device 200 to other digital devices and computer systems.

Although the computing device 200 shown in FIG. 2 illustrates a particular bus structure providing a direct communication path among the processors 206, the memory 212, the bus interface 208, the display system 204, and the I/O bus interface unit 214, in alternative embodiments the computing device 200 may include different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 214 and the I/O bus 208 are shown as single respective units, the computing device 200, may include multiple I/O bus interface units 214 and/or multiple I/O buses 216. While multiple I/O interface units are shown, which separate the I/O bus 216 from various communication paths running to the various I/O devices, in other embodiments, some or all of the I/O devices are connected directly to one or more system I/O buses.

In various embodiments, the computing device 200 is a multi-user mainframe computer system, a single-user system, or a server computer or similar device that has little or no direct user interface, but receives requests from other computer systems (clients). In other embodiments, the computing device 200 may be implemented as a desktop computer, portable computer, laptop or notebook computer, tablet computer, pocket computer, telephone, smart phone, or any other suitable type of electronic device.

In an embodiment, the memory 212 may include a random-access semiconductor memory, storage device, or storage medium (either volatile or non-volatile) for storing or encoding data and programs. In another embodiment, the memory 212 represents the entire virtual memory of the computing device 200, and may also include the virtual memory of other computer systems coupled to the computing device 200 or connected via a network 230. The memory 212 may be a single monolithic entity, but in other embodiments the memory 212 may include a hierarchy of caches and other memory devices. For example, memory may exist in multiple levels of caches, and these caches may be further divided by function, so that one cache holds instructions while another holds non-instruction data, which is used by the processor. Memory 212 may be further distributed and associated with different CPUs or sets of CPUs, as is known in any various so-called non-uniform memory access (NUMA) computer architectures.

The memory 212 may store all or a portion of the components and data shown in FIG. 1 (e.g., database manager 132). These programs and data structures are illustrated in FIG. 2 as being included within the memory 212 in the computing device 200; however, in other embodiments, some or all of them may be on different computer systems and may be accessed remotely, e.g., via a network 230. The computing device 200 may use virtual addressing mechanisms that allow the programs of the computing device 200 to behave as if they only have access to a large, single storage entity instead of access to multiple, smaller storage entities. Thus, while the components and data shown in FIG. 2 are illustrated as being included within the memory 212, these components and data are not necessarily all completely contained in the same storage device at the same time. Although the components and data shown in FIG. 2 are illustrated as being separate entities, in other embodiments some of them, portions of some of them, or all of them may be packaged together.

FIG. 2 is intended to depict representative components of the computing device 200. Individual components, however, may have greater complexity than represented in FIG. 2. In FIG. 2, components other than or in addition to those shown may be present, and the number, type, and configuration of such components may vary. Several particular examples of additional complexity or additional variations are disclosed herein; these are by way of example only and are not necessarily the only such variations. The various program components illustrated in FIG. 2 may be implemented, in various embodiments, in a number of different ways, including using various computer applications, routines, components, programs, objects, modules, data structures etc., which may be referred to herein as "software," "computer programs," or simply "programs."

Figure 3:
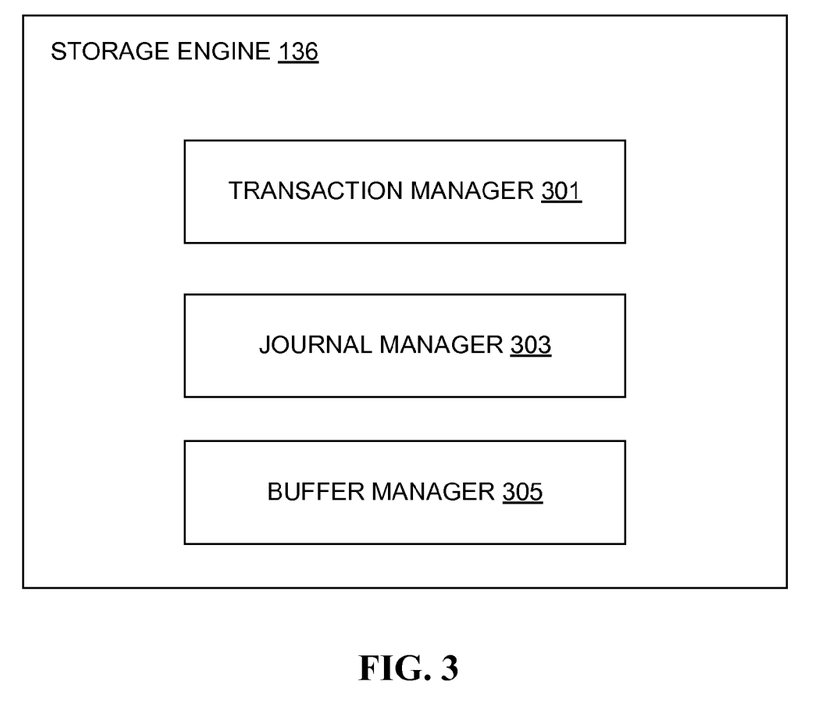
FIG. 3 is a block diagram illustrating an example embodiment of the storage engine of FIG. 2.

FIG. 3 is a block diagram illustrating an example embodiment of the storage engine 136 of FIG. 1. In an embodiment, the storage engine 136 may include a transaction manager 301, a journal manager 303, and a buffer manager 305.

The transaction manager 301 may be responsible for coordinating various transactions (also known as commit cycles) within the database files 110. A transaction is one or more operations that make up a unit of work performed against a storage device. For example, a transaction may include the I/O operations of deleting a database record, and inserting a new database record. In various embodiments, a transaction may be in multiple states. For example, the transaction may be in in active state (uncommitted state). In an active state, a transaction has begun and is currently being executed by the transaction manager 301, which may be the initial state of every transaction. The transaction may also be in a partially committed state (uncommitted state). In a partially committed state, the transaction manager 301 may execute its final operation without performing various checks (e.g., the consistency state of a database file 110 after applying output of the transaction on the database file 110). Moreover, the transaction may be in a committed state. If the transaction manager 301 executes all of its operations successfully, which includes successfully performing various checks, then the transaction may be in a committed state. Accordingly, all of the committed transactions may permanently be applied to the database files 110 within the storage device 128. The transaction may also be in a failed state (uncommitted state). If any checks fail, the transaction may be in a failed state such that the transaction can no longer proceed. If any of the checks fail, and the transaction is in a failed state, the transaction manager 301 may "rollback" any uncommitted transactions to place the database file 110 in a state prior to the start of the execution of the transaction, which is called an aborted state (e.g., re-start, kill transaction).

Figure 5:
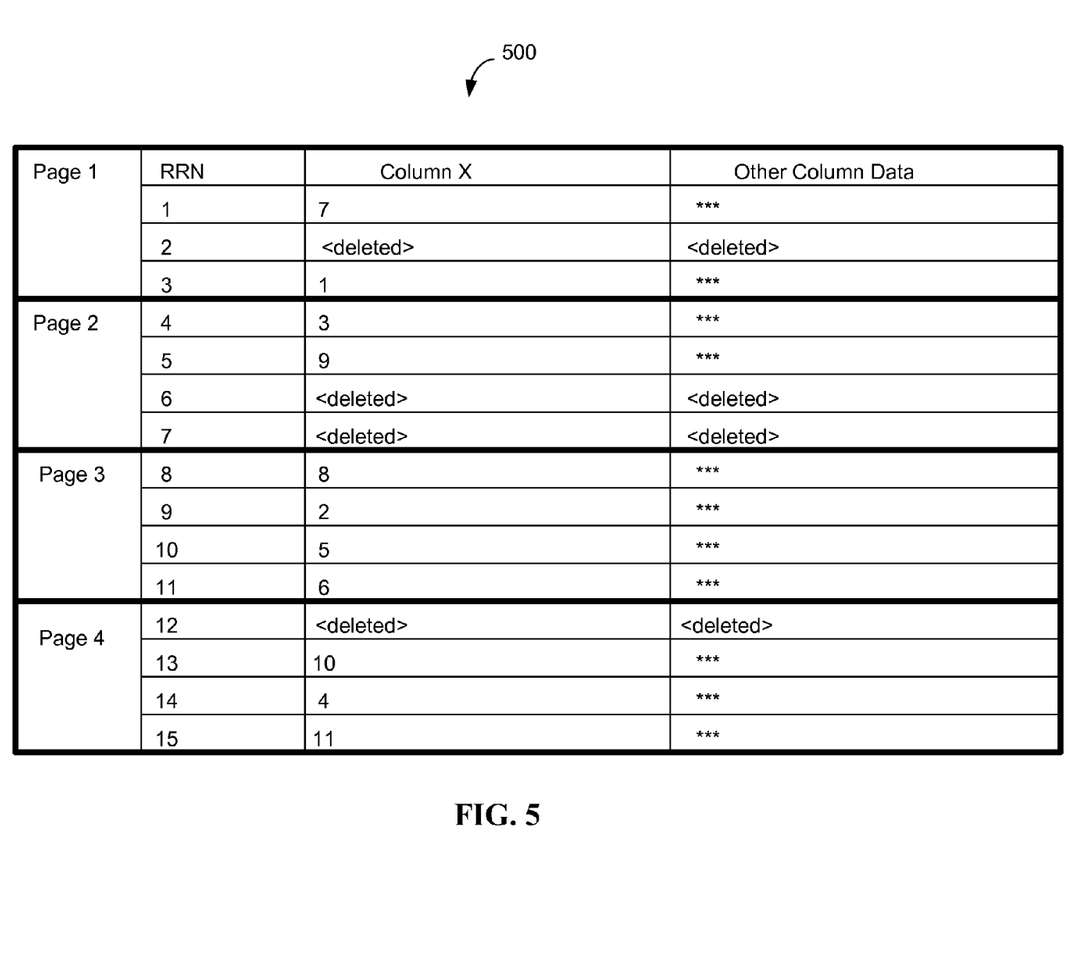
FIG. 5 is one embodiment of an example database file table that includes various pages, columns, and deleted database records, according to embodiments.

Consistent with some embodiments, the transaction manager 301 may communicate with a journal manager 303 to write various uncommitted transactions to a journal log (also known as a transaction log, commit log, or journal receiver). The journal manager 303 may be responsible for that actual writing of various transaction operations to the journal log. The journal log may include entries (e.g., log sequence numbers (LSNs)) that specify identification numbers of database record(s) (e.g., relative record numbers (RRNs)) and corresponding operational changes to the database files 110. For example, the operational changes that may be logged are insert, update, or delete operations of various database records. A RRN may indicate the database record's logical position in a database file 110. For example, relative record numbers of the first, third, and fifth database records in a table may be 1, 3, and 5 respectively, as illustrated in FIG. 5. The entries may also specify a time stamp to determine when the operational change occurred. These entries may be useful for recovery purposes (e.g., snapshot and point-in-time recovery). A series of entries in a journal log may be considered a journal bundle. The journal bundle may be cached or buffered in the memory 112 until a threshold write size occurs (e.g., an optimal write size of 128K). In embodiments, when the threshold write size occurs, the journal bundle may only then be written to a storage device 128. For example, when various changes to database record(s) are made and written to the journal log in memory 112, the journal manager 303 may "pin" the database record(s) to temporarily prevent writing (e.g., paging out) to the storage device (i.e., prevent actual database changes to occur within the database file on disk). When the journal bundle reaches the threshold write size, the pins may be released such that the bundle is written to the storage device 128. This may occur to allow for journal log changes to properly be written to the storage device 128 for recovery purposes.

In some embodiments, the "pinning" of a first database record may allow for the reuse of deleted database records located on the same page as the first database record. For example, if a user transaction includes two insert operations, the user's first insert operation may be logged as an entry within the journal log. The database manager may "pin" the entry (along with the corresponding bundle) so that it is not written to disk. This may allow the user to utilize the first insert operation database record to find a deleted database record located on the same page as the first insert operation. This may allow the user to use a deleted database record for the second insert operation, as described further below. In some embodiments, a first transaction may utilize an operation of a second transaction to find deleted database records as long as the second transaction's operations are included in a same journal log bundle. For example, if a first transaction included an update operation, a second transaction that included an insert operation may utilize the update operation from the first transaction to find deleted rows, as long as the first transaction's operations were a part of the same journal bundle.

In various embodiments, the journal manager 303 and journal log are utilized to determine whether a deleted database record is located on the same page as a first operation. In an illustrative example, at a first time a user issues a query request to delete a database record i, wherein a journal manager 303 inserts a LSN entry to a journal log bundle specifying that a deleting operation of database record i occurred at the first time. At a second time, the user issues a query request to insert a database record. In some embodiments, the database file 110 that corresponds to the insert operation has as an attribute, the REUSE DLT (*YES) default operation such that the reusing of deleted database records may be used for inserting the database record.

At a third time, the journal manager 303 determines whether there is a previously deleted record available on the same page as the deleted database record i. The journal manager 303 may do this by scanning (reading) the journal log and identifying that the database record i entry within the journal includes a particular RRN. A buffer manager 305 may then utilize an index or other object to match the RRN from the journal log to the corresponding RRN of the database record i located in the database file 110. In some embodiments, the matching occurs by multiplying the journal log RRN (e.g., RRN 12) by database record i length (e.g. 4 k) to locate the RRN in the database file 110. The database record i RRN within the database file 110 includes a page that the database record i is on. Accordingly, the buffer manager 305 scans the corresponding page and selects the deleted database record i as the record to be used for the inserting operation.

The buffer manager 305 may be responsible for interfacing with the storage device 128 by reading storage device 128 pages into main memory pages in the manner described above. According to embodiments, in order for the buffer manager 305 to perform an operation, the buffer manager 305 may select one or more previously deleted database records that are requested based on an insert query request. In various embodiments, the buffer manager 305 may select the one or more database records from the memory 112 or different types of database files 110 using various selection techniques. For example, the one or more database records may be selected from a database table data structure, and may have a RRN, as described above. In another embodiment, the data structure may be a simple file such as a binary large object (BLOB), or a character large object (CLOB). Alternatively, the data structure may be arrays with fixed-length entries, or a linked list. In an embodiment, the buffer manager 305 may utilize index structures to access and select the corresponding set of database records, which groups database records together thereby making it easier for database record access. For example, the buffer manager 305 may access a database record by utilizing a hash-based index, or a tree-based index such as a B+ tree. Indexes may also be clustered, non-clustered, primary, secondary, dense, sparse or configured in any other manner. In an alternative embodiment, the buffer manager 305 may utilize a full-table scan, wherein the buffer manager 305 scans database records one at a time until a desired one or more database records are selected. In other embodiments, the index may be an offset from a starting table location based on the size of a database record multiplied by the number of database records.

The buffer manager 305 may select database records (including deleted database records) from the database file 110 files in various manners. For example, the buffer manager 305 may directly interface with the database files 110 through a block device, such as a raw access storage device, wherein the buffer manager 305 bypasses the operating system's caches and buffers and accesses the database record (also known as a disk block or physical record). Alternatively, the buffer manager 305 may select the set of database records through a component of an operating system, called a disk manager, wherein the disk manager receives the low-level file system commands from the buffer manager 305 and manages disk space for storage in the database 210.

Figure 4:
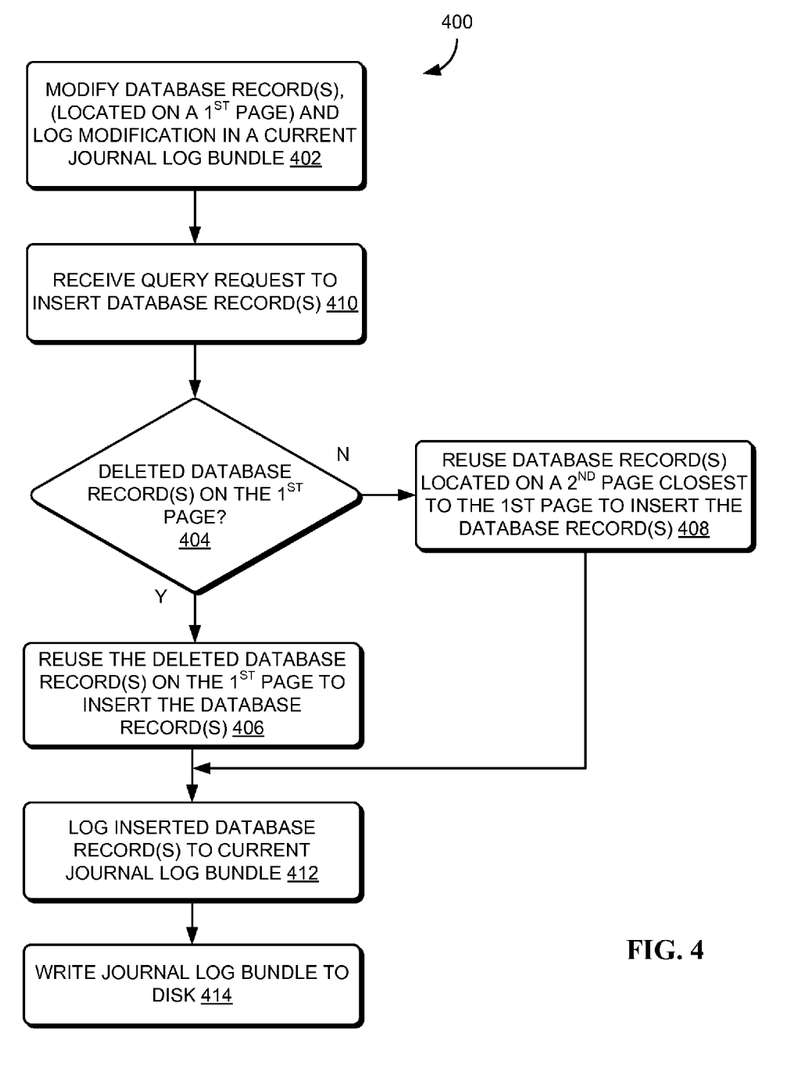
FIG. 4 is a flow diagram of one embodiment of an example process for determining whether a deleted database record(s) is available on the same page as a prior modification in a current log journal bundle.

FIG. 4 is a flow diagram of an example process 400 for determining whether a deleted database record(s) is available on the same page as a prior modification in a current journal log bundle. In some embodiments, the database manager 132 performs the process 400. The blocks as specified in process 400 are not limited by the order as illustrated in FIG. 4. Moreover, the process 400 may include more or less blocks than the blocks specified in FIG. 4. For example, the process 400 may include block 410 without necessarily including block 402.

In some embodiments, the process 400 starts with block 402 when a database manager modifies one or more database records as a result of a user query request. In embodiments, the modifications are logged to a current journal log bundle. For example, a user may issue a query request to both update a database record and insert another database record. The update may be the modification, and may have a corresponding page number in a database file as well as a corresponding RRN in the journal log. The modification in block 402 may be any suitable operation, such as an insert or delete operation.

In block 410, a database manager may receive a query request to insert one or more database records. Using the example above, this may be a part of the transaction to both update a particular database record and insert another database record. In other embodiments, the insert request may be a separate request as part of a different transaction, but within the same journal bundle.

The database manager may then determine in block 404 if there is one or more previously deleted database records located on the first page. In embodiments, the database manager may perform this operation when the database employs "reuse deleted database records" as an attribute (REUSEDLT (*YES)). As described in the present disclosure above, the database manager may determine whether the one or more deleted database records are on the first page by reading the journal log entry of the modification to determine the RRN of the modification (e.g., the update operation entry using the example above). The database manager, with the help of an index, may locate a matching modification RRN in the database file. The RRN located in the database file may give the position of the corresponding page in the database file. Once a page is found, the database manager may scan the database file to determine whether there are one or more deleted database records on the same page.

If there are not one or more deleted database records located on the first page, then the database manager may select and reuse one or more deleted database records located on a second page at block 408. In embodiments, this page may be closest to the first page such that the physical read head of a disk drive may continue forward on the storage device disk. For example, if an insert operation occurred on page 2 of a database file, and it was discovered that no previously deleted database record was available on page 2, but one was available on page 1 and 3, the previously deleted database record may be chosen from page 3. In embodiments, this may be because the read head of a disk drive may start at page 1 and move forward to page 3. Accordingly, if deleted database records were selected from page 1, the read head (which may at the end of page 2 because of the first insert operation) may have to move backwards, which may cause additional and unnecessary I/O cycles. In block 408, once the one or more database records are reused on the second page, the process 400 may perform block 412, which is described below.

According to embodiments, if there are one or more deleted database records found on the first page, then a database manager may perform block 406 to select and reuse the one or more deleted database records on the first page to insert the one or more database records.

In block 412, once the deleted database records have been utilized to complete an insert query request, the corresponding operation may be logged to the current journal log bundle (e.g., the same journal log bundle that was a part of the modification in block 402). When, the journal log bundle reaches a particular write size, the pins may be released such that the bundle is written to disk at block 414. Accordingly, the operations of the modification (block 402) and the reusing of deleted database records (blocks 408 or 406) may be written to disk in a single I/O operation. This may have various advantages. For example, in a conventional database manager system, the database manager may not find deleted database records in relation to a page of a current journal entry (e.g., the database manager does not perform blocks 406 or 408). The deleted database records may be accordingly be chosen from an arbitrary page within a database table, which may not be located in a current journal bundle. Therefore, in conventional systems, the database manager may have to perform at least two different disk I/O operations—one operation to write current journal log bundle entries to disk, and one operation to account for the change of reusing a deleted database record not located in a current journal log bundle (e.g., a change already made to disk at a prior time).

FIG. 5 is an illustrative database file table 500 that includes various pages, columns, and deleted database records, according to embodiments. The example table 500 specifically includes pages 1-4, RRNs 1-15, column X, which includes data values (e.g., 7, 1, 3, etc.), and other column data. There are also delete flags (<deleted>) located on RRNs 2, 6, 7, and 12. The delete flags may correspond to previously deleted database records. Accordingly, instead of the column X showing values for the deleted database records, the delete flag is written over the values indicating that a record has been deleted and may not be queried. In various embodiments, the RRN column may be implicit or hidden such that it is not visible to users. In embodiments, the table 500 may include many more pages, RRNs per page, and various columns that include more values.

In an example illustration, during a single transaction, a user may decide to update a particular database record and insert another database record. Accordingly, at a first time the user may issue an update query request specifying: "UPDATE MYTable SET Other Column Data=:hostVar1 WHERE Column X=10." This query may accordingly request to update a value located on page 4 under "Column X" where the value is 10, which is part of RRN 13. In embodiments, after the UPDATE query request has run, at a second time, the user may issue an insert query request as follows: "INSERT Into MYTable values (11, :hostVar2)." When the insert request is made, the database manager may scan a current journal log bundle to determine if any of the entries correspond to database records that have been deleted. In the example illustration, the database manager may first determine whether there are any deleted database records located on the same page as the UPDATE operation database records. Accordingly, a database manager may utilize the UPDATE operation RRN 13 from the current journal log bundle to match it to the corresponding update RRN 13 within memory (shown in FIG. 5). As illustrated, the only deleted database record on page 4 is RRN 12. Therefore, the database manager may reuse deleted database record RRN 12 to insert a new set of database records.

Aspects of the present invention may be a system, a method, and/or a computer program product. The computer program product may include a computer readable storage medium (or media) having computer readable program instructions thereon for causing a processor to carry out aspects of the various embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of embodiments of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method for reusing deleted database records, comprising:
   receiving, by a database manager executing within a computing device, a first query request to insert, into a database table, a first set of database records;
   identifying, by the database manager, a first set of entries within a journal log bundle, the first set of entries corresponding to a second set of database records that have been modified within the database table;
   in response to identifying, by the database manager, the first set of entries, determining, by the database manager, that there is a third set of deleted database records located on a same page as the second set of database records; and
   in response to the determining, by the database manager, that there is a third set of deleted database records located on a same page as the second set of database records, inserting into the database table the first set of database records using the third set of deleted database records.

2. The method of claim 1, wherein determining, by the database manager, that there is a third set of deleted database records located on a same page as a second set of database records includes:
   identifying a relative record number (RRN) of the first set of entries within the journal log bundle, the RRN specifying a relative position of the second set of database records within a database file that includes the database table;
   in response to identifying the RRN, determining that the second set of database records are located on the page; and
   in response to determining that the second set of database records are located on the page, identifying the third set of deleted database records located on the page.

3. The method of claim 1, further comprising:
   writing, by the database manager, a second set of entries to the journal log bundle in response to the inserting into the database table the first set of database records using the third set of deleted database records;
   determining, by the database manager, that the journal log bundle has reached a threshold size; and
   in response to the determining that the journal log bundle has reached a threshold size, writing, by the journal manager, the journal log bundle to a storage device.

4. The method of claim 1, further comprising:
   receiving, by the database manager, prior to receiving the first query request, a second query request, the second query request specifying updating the second set of database records; and updating, by the database manager, the second set of database records.

5. The method of claim 4, wherein first and second query requests are a part of a same transaction, wherein the transaction is a unit of work that makes up one or more database operations.

6. The method of claim 1, further comprising:
receiving, by the database manager, prior to receiving the first request, a second query request, the second query request specifying deleting the second set of database records; and
setting a delete flag, by the database manager, for the second set of database records on the page to delete the second set of database records.

7. The method of claim 6, wherein the third set of deleted database records includes the second set of database records.

8. A computer-implemented method for reusing deleted database records, comprising:
receiving, by a computing device, a query request to insert a set of database records into a database table;
analyzing, in response to the receiving of the request and by the computing device, a plurality of entries within a journal log bundle, each of the plurality of entries include: an ID of a particular database record, an identification of an operational change associated with the particular database record within a particular database table, and a time stamp value indicating when the operational change occurred;
determining, by the computing device, that there is a first set of deleted database records located on a same page as at least one of the particular database record based at least on matching the ID of the particular database record to a corresponding ID in the particular database table, the ID of the particular database record within the journal log bundle indicating that the particular database record is on a particular page; and
in response to the determining that there is a first set of deleted database records located on the same page as at least one of the particular database record, inserting into the database table the set of database records using the first set of deleted database records.

9. A computer-implemented method for reusing deleted database records, comprising:
receiving, by a processor executing within a computing device, a Structured Query Language (SQL) query request to insert a set of database records into a first database table;
identifying, by the processor, a first set of entries within a journal log bundle, the journal log bundle includes a history of time-stamped changes that occurred within a plurality of database tables, the plurality of database tables includes the first database table, the first set of entries identifying a second set of database records that have been modified within a particular database table;
determining, by the processor and based on analyzing the first set of entries, that there is a third set of deleted database records located on a same page as the second set of database records; and
in response to the determining that there is a third set of deleted database records located on the same page as the second set of database records, inserting into the first database table the set of database records using the third set of deleted database records, the inserting causing a reduction of additional I/O operations needed to make changes within the first database table.

* * * * *